(12) United States Patent
McClanahan

(10) Patent No.: US 7,041,213 B1
(45) Date of Patent: May 9, 2006

(54) STORMWATER PRETREATMENT AND DISPOSAL SYSTEM

(75) Inventor: Shawn McClanahan, Collinsville, OK (US)

(73) Assignee: Quiktrip Corporation, Tulsa, OK (US)

( * ) Notice: Subject to any disclaimer, the term of this patent is extended or adjusted under 35 U.S.C. 154(b) by 319 days.

(21) Appl. No.: 10/619,953

(22) Filed: Jul. 14, 2003

(51) Int. Cl.
*E03F 1/00* (2006.01)
*E03F 7/02* (2006.01)

(52) U.S. Cl. .................. 210/85; 210/96.1; 210/100; 210/104; 210/109; 210/121; 210/170; 210/533

(58) Field of Classification Search ............ 405/52; 210/85, 86, 96.1, 100, 104, 109, 117, 121, 210/170, 533, 747
See application file for complete search history.

(56) References Cited

U.S. PATENT DOCUMENTS

| | | | |
|---|---|---|---|
| 3,626,823 A | 12/1971 | Toth | |
| 3,966,603 A | 6/1976 | Grant | |
| 4,020,488 A | 4/1977 | Martin | |
| 4,923,330 A | 5/1990 | DeTommaso | |
| 5,067,850 A | 11/1991 | Gray | |
| 5,160,036 A | 11/1992 | Childers | |
| 5,484,522 A | 1/1996 | Entrekin | |
| 5,569,372 A | 10/1996 | Smith | |
| 5,906,572 A | 5/1999 | Holland | |

OTHER PUBLICATIONS

Correspondence to Arizona Department of Environmental Quality—Jan. 29, 2002; we do not believe scope of distribution arises to level of publication.
Correspondence to QuickTrip Corporation—Mar. 15, 2002; we do not believe scope of distribution arises to level of publication.
Email with attachments dated Dec. 26, 2001 from Dennis Turner of ADEQ for distribution.
The Envibro System Drainage System Product Information and Design Features by McGuckin Drilling Incorporated dated Aug. 1996.

*Primary Examiner*—Terry K. Cecil
(74) *Attorney, Agent, or Firm*—Doerner, Saunders Daniel & Anderson, LLP

(57) ABSTRACT

A stormwater drainage system capable of collecting, pretreating and disposing of the stormwater runoff into a dry well. Further capable of stopping the flow of stormwater into the dry well in the event hydrocarbons or other contaminants are present in the stormwater. The system is also capable of isolating stagnant water in the system to prevent the infestation of mosquito larvae.

11 Claims, 2 Drawing Sheets

STORMWATER PRETREATMENT AND DISPOSAL SYSTEM

BACKGROUND OF THE INVENTION

1. Field of the Invention

This invention relates to a stormwater pretreatment system, more particularly to a stormwater pretreatment system that uses an actuated valve to isolate the disposal well from the stormwater in the event the stormwater is contaminated by gasoline, diesel fuel, kerosene or other hydrocarbons. Further, this invention relates to a stormwater pretreatment system that isolates standing water in the oil/water separation to reduce the effect of infestation of mosquito larvae.

2. Prior Art

When it rains on unimproved natural land, the rain and stormwater runoff is either absorbed into the soil or moves along the surface of the land, moving downward towards creeks and larger and larger rivers. However, as areas become more densely populated, this natural dispersion of rain and stormwater is altered by the man-made improvements such as parking lots, roads and buildings and earth work disturbing the original contours of the land. This also leaves less open ground surface to absorb the rain, thus adding to the stormwater runoff.

In many cities, stormwater sewers are constructed to handle the large amount of stormwater runoff that comes off of the buildings, parking lots and roads. The stormwater sewers route the water to creeks and drainage ditches which form the tributaries to larger rivers. However, most cities in arid regions do not have a stormwater sewer; therefore, when it rains there is no pathway for disposing of the stormwater runoff coming from the buildings, parking lots, roadways, etc.

In many of the cities without stormwater sewers, landowners are required to construct a system to collect the stormwater runoff and a disposal well or dry well which puts the water into a pervious subsurface structure.

The disposal of the stormwater can be further complicated when it becomes contaminated with petroleum byproducts or other substances which can contaminate the groundwater or aquifer. As such, it is necessary to have a system which is capable of stopping the flow of stormwater runoff into the dry well when gasoline, diesel fuel, kerosene or other hydrocarbons are present in the stormwater runoff.

Catch basins capable of intercepting contaminated stormwater runoff are known in the art. U.S. Pat. No. 5,569,372 entitled "Catch Basin Structure for Interception of Contaminants Having Detachable Parts" issued on Oct. 29, 1996 discloses a catch basin structure equipped with a manual valve capable of stopping the flow of stormwater runoff. Likewise, U.S. Pat. No. 5,067,850 entitled "Apparatus for Detection and Containment of Pollution in a Drainage System" issued to Robert L. Gray on Nov. 26, 1991 discloses a storm drainage system including a gate which controls the release of the contents of the drainage system. The gate is motor activated which is responsive to manual activation or hydrocarbon sensor activation.

U.S. Pat. No. 5,160,036 entitled "Automatic Pollution Containment and Alert Apparatus for Liquid Drainages" issued to Charles P. Childers on Nov. 3, 1992 discloses an apparatus for containing liquids and pollution within a liquid drainage comprising a first conduit, a second conduit, a liquid barrier, a means for lifting, and a means for sensing pollution. In the device disclosed in the Childers' patent, the one end of the second conduit can be lifted to stop the flow of the drainage.

While the Smith, Gray and Childers patents all disclose ways of stopping the flow of stormwater runoff in the event of contamination, they do not disclose a complete system necessary for collecting, pretreating and disposing of stormwater runoff into the groundwater or an aquifer.

The ENVIBRO System marketed by McGuckin Drilling, Inc. is a system to pretreat stormwater runoff and dispose of it into the groundwater or an aquifer. The ENVIBRO System, as disclosed in the brochure, has a collection chamber which feeds into a three-chambered separator which removes silt and other impurities from the stormwater. The three-chambered separator feeds into a dry well which disposes of the stormwater into the groundwater or an aquifer. The ENVIBRO System has a passageway between the three-chambered separator and the disposal well. The entry into this passageway is partially filled with a plurality of proprietary IMBIBER beads.

Under normal operation, water passes freely through the entryway. However, when contacted by an active organic liquid, the IMBIBER beads absorb the liquid and expand. The swollen beads fill the entry into the passageway, thus stopping the flow of contaminated water. Once the system has been activated by a pollutant, the flow of water stops. In order to reuse the system, the polluted water must be pumped off and the entryway with the beads must be replaced. This adds additional cost to the operation and requires additional time.

SUMMARY OF THE INVENTION

Due to the shortcomings of the prior art, it is an objective of the present invention to provide a stormwater pretreatment and disposal system which is capable of gathering and storing the stormwater runoff, while removing gasoline, diesel fuel, kerosene and other lighter than water contaminants as well as sediment from the stormwater and disposing of the stormwater down a disposal well, and have the capability of stopping the flow down the disposal well in the event contaminants are sensed in the stormwater.

Another objective of the present invention is to provide a stormwater pretreatment and disposal system as previously mentioned which is capable of being reset to allow the flow of stormwater down the disposal well once the system has been tripped without replacement of parts. This is achieved through the use of an actuated valve and a discriminating sensor capable of differentiating between contaminants and stormwater. The system can also be equipped with a remote control panel and alarm so that an operator can be alerted of the presence of contaminants in order to take the appropriate action.

It is a further objective of the present invention to provide a stormwater pretreatment and disposal system as previously described which is capable of isolating standing water from the ambient air in order to eliminate mosquito breeding grounds.

Other objects, features, and advantages will be apparent to persons of ordinary skill in the art in view of the following detailed description of preferred embodiments and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings in which.

DETAILED DESCRIPTION OF THE PREFERRED EMBODIMENT

Figure 1:
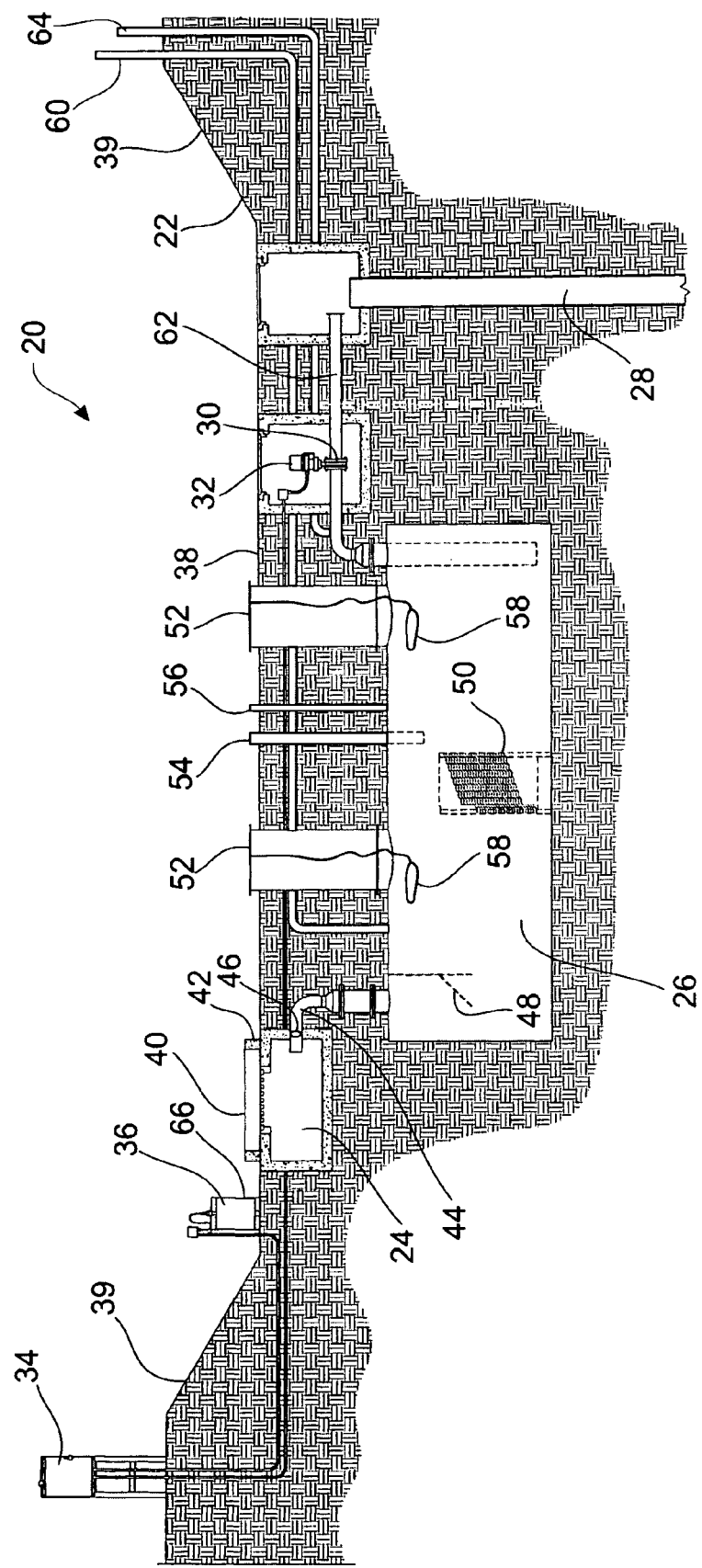
FIG. 1 is a cross sectional schematic of the preferred embodiment of the present invention.

FIG. 1 shows the preferred embodiment of the stormwater pretreatment and disposal system 20. The stormwater pretreatment system 20 is used to gather stormwater runoff and process it prior to disposing of the stormwater into the groundwater or an aquifer. The stormwater pretreatment system 20 is comprised of a retention area 22 with a collection vault 24, oil/water separator 26, dry well 28, and a valve 30 with an actuator 32, controls 34, and sensing probe 36. The retention area 22 has a bottom 38 and one or more walls 39 which form a pit to hold water.

The collection vault 24 is typically located in the bottom 38 of the retention area 22 such that the inlet 40 of the collection vault 24 is located in the bottom 38 of the retention area 22. If necessary to prevent the sediment from entering the collection vault 24, the inlet 40 can be raised slightly above the bottom 38 of the retention area 22. The collection vault 24 has a pipe 44 which leads from the collection vault 24 to the oil/water separate 26. The pipe 44 has a swing check valve 46. The swing check valve 46 allows the stormwater to flow from the collection vault 24 into the oil/water separator 26. However, when there is no flow through the pipe 44, the swing check valve 46 closes off the passageway of the pipe 44. This prevents mosquitoes from incubating in stagnant water found in the oil/water separator 26 and then becoming a nuisance on the property adjacent the stormwater pretreatment system 20.

The oil/water separator 26 can be equipped with baffles 48 which help direct the flow of the stormwater through the oil/water separator 26 to increase dwell time in the oil/water separator 26 reduce velocity and turbulence and thus increase its efficiency. The oil/water separator 26 is also equipped with a plate coalescer 50 which is used to separate any gasoline, diesel fuel, kerosene and other hydrocarbon contaminants as well as sediment from the stormwater.

The oil/water separator 26 shown in figure one can also be equipped with one or more manways 52 which are used so that individuals can access the interior of the oil/water separator 26 to service and/or clean it. It can also be equipped with a pump out riser 54 used to pump out residual oil, sludge and other waste captured by the oil/water separator 26. It can be equipped with a level sensor riser 56 used to monitor the liquid level of the oil/water separator 26. One of more absorbent pillows 58 typically used in the industry can be placed in the oil/water separate 26 in order to absorb small amounts of oil and hydrocarbon residue floating on the surface of the stormwater. The absorbent pillows 58 can be held in place by a line attached to the top of one of the manways 52. This allows for easy replacement of the absorbent pillows 58 without having to enter the oil/water separator 26.

The oil/water separator 26 can also be equipped with a vent 60. The vent 60 allows explosive and poison gases from the hydrocarbons to escape the oil/water separator 26. This reduces the possibility of explosion or other worker safety issues when workers have to enter the oil/water separator 26 for maintenance. In order to minimize the incubation of mosquitoes in stagnant water in the oil/water separator 26 the vent 60 can be fitted with screen such that it allows vapor to escape through the vent 60 but restricts the movement of mosquitoes through the vent 60.

There is a second pipe 62 leading from the oil/water separator 26 to the dry well 28. The second pipe has a valve 30 which can stop the flow of stormwater through the second pipe 62. In the preferred embodiment, the valve 30 has an actuator 32. The actuator 32 is operated by the controls 34. When the sensing probe 36 detects contaminants such as hydrocarbons in the stormwater, the controls 34 operate the actuator 32 to close the valve 30. This stops the flow of the stormwater into the dry well 28 and prevents contamination of the groundwater or aquifer with hydrocarbons or other pollutants. The second pipe 62 leads to the dry well 28. Stormwater from the second pipe 62 enters the dry well 28 where it is disposed into a pervious subsurface ground structure, the groundwater or an aquifer.

In the preferred embodiment, the valve 30 is a butterfly valve. However, any other type of valve capable of stopping the flow of stormwater through the second pipe 58 could be used. In the preferred embodiment, the actuator 32 is an electric operated actuator. However, the valve 30 could be operated by a pneumatic or hydraulic power. The second pipe 62 can also be fitted with an anti-siphon valve 64 to prevent siphoning during discharge into the dry well 28.

The operation of the stormwater pretreatment system 20 is operated by electronic controls 34. These controls can be a programmable logic controller or hardwire electrical controls. The sensing probe 36 typically used would be a hydrocarbon discriminating probe which is capable of sensing the presence of hydrocarbons, such as gasoline, diesel fuel, kerosene and other hydrocarbons in the stormwater. The sensing probe 36 can be placed in a protective cage 66. This protects the probe 36 from the flow of stormwater and any debris that may be present in the stormwater.

The control panel 34 would be mounted near the pretreatment and disposal system 20. In the preferred embodiment the control panel 34 can be equipped with audio alarm and/or a visual readout or light to notify the operator of the presence of contaminants in the stormwater. This would allow the operator to take appropriate measures to remove contaminants from the system 20.

Figure 2:
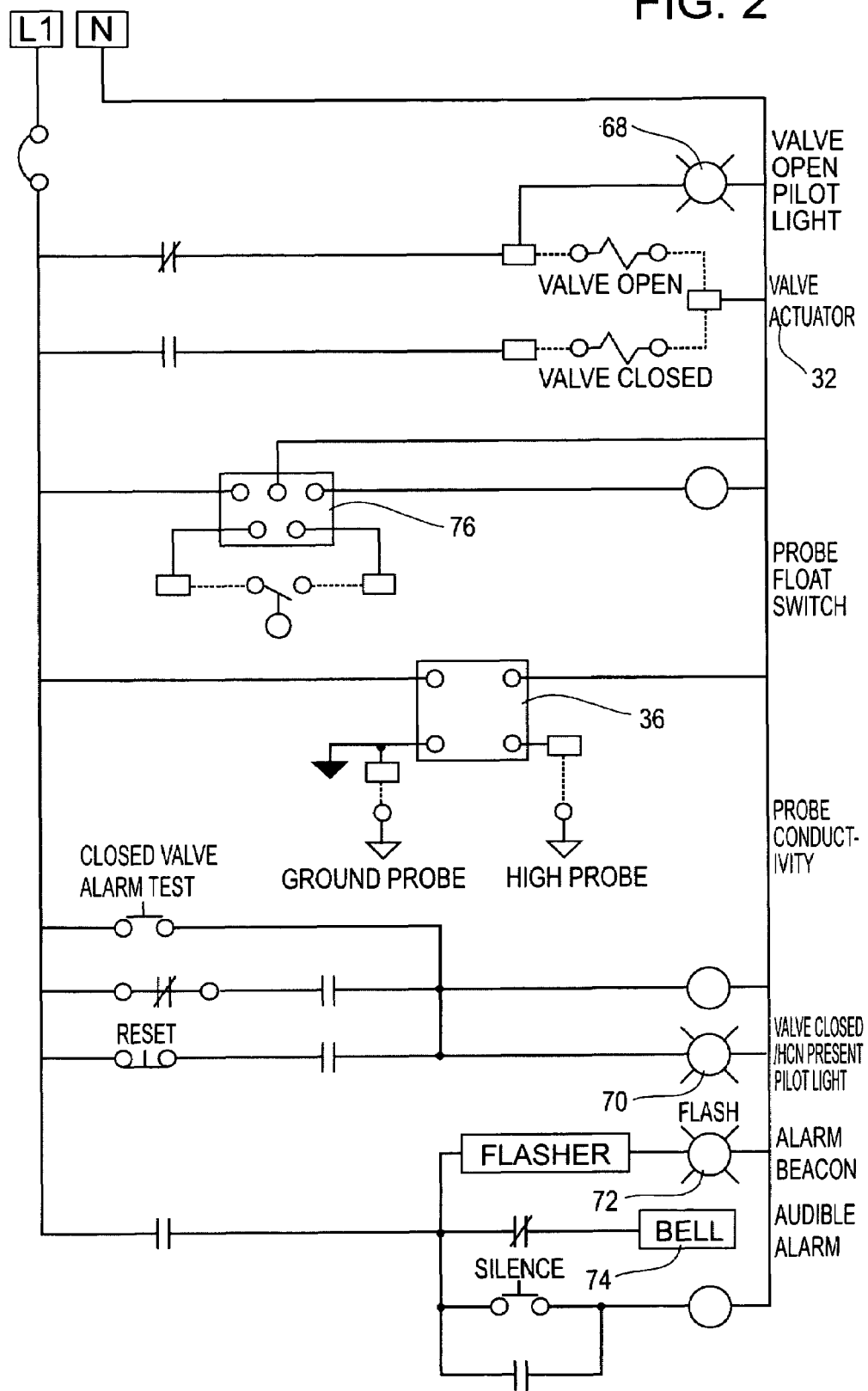
FIG. 2 is a schematic diagram of the electronics to operate the system.

FIG. 2 is a valve control schematic of the preferred embodiment. The schematic shows the valve actuator 32 which can maintain the valve in an open or closed position. In the preferred embodiment shown, there is a first indicator 18, such as a green light, which would indicate when the valve 30 is open. A second indicator 70, such as a red light, can show when the valve 30 is closed. A third indicator 72, such as a flashing red light, can be used as an alarm beacon when the presence of hydrocarbons are found. The third indicator 72 can also be accompanied by an audible alarm 74. FIG. 2 also shows a probe float switch 76, which is necessary when the system 20 is operated where the valve 30 is in a normally closed position. The probe float switch would typically be located in the same protective cage 66 as the sensing probe 36.

The system 20 can be operated in two modes. The first mode is where the valve 30 is in a normally open position. The second mode would be when the valve 30 is in a normally closed state. In the first mode, where the valve 30 is maintained in a normally open position, the stormwater runs off of the property and is captured in the retention area 22 where it flows into the collection vault 24, through the pipe 44 and into the oil/water separator 26. Baffles 48 and the plate coalescer 50 help reduce the velocity of the flow of stormwater through the oil/water separator 26. This in turn allows sediment to fall out of the stormwater flow. This also helps lighter contaminants such as gasoline, diesel fuel, kerosene and other hydrocarbons to float to the top, where small quantities can be removed by the absorbent pillows 58. The stormwater then flows through the second pipe 62, through the open valve 30 and into the dry well 28. The stormwater is then absorbed into a permeable subsurface ground structure.

If hydrocarbon contaminants are sensed by the sensing probe 36, the controls 34 operate the actuator 32 which closes the valve 30. This stops the flow of contaminated stormwater into the dry well 28. The controls also activate a third indicator 72, such as a flashing light and an audible alarm 74, to notify the operator that the system 20 has detected contaminants and the second indicator 70 will show the valve 30 is closed.

The operator can then assess the situation. If the sensing probe 36 has sent out a false signal, the operator can override the signal and open the valve 30 allowing the system 20 to continue pretreating the stormwater and putting it into the dry well 28. However, if contaminants are determined to be present, the operator can make arrangements to remove the contaminants from the stormwater, contained by the system 20. Once the contaminants have been removed, the actuator 32 can be used to open the valve 30 and dispose of the remaining uncontaminated stormwater.

In the event the system 20 is operated in the second mode, the actuator 32 would maintain the valve 30 in a closed position and the second indicator 70 would be on. Stormwater would be allowed to accumulate in the retention area 22. Once the probe float switch 76 senses the presence of stormwater, the controls 34 would operate the actuator 32 to open the valve 30. A first indicator light 18, typically a green light mounted on the controls 34, would indicate to an operator that the valve 30 was open. The opening of the valve 30 would allow the stormwater to flow through the system as previously described. In the event gasoline, diesel fuel, kerosene, other hydrocarbons or other contaminants were detected by the sensing probe 36, the controls 34 would then operate the actuator 32 to close the valve 30, thus stopping the flow of contaminated stormwater into the dry well 28. The presence of the contaminants would cause the third indicator 72 and the audible alarm 74 to be activated to notify an operator of the presence of the contaminants. The second indicator 70 would be activated to show the valve 30 was closed. The operator could then determine the problem and act accordingly as previously described.

In the preferred embodiments just described, the first, second and third indicators, 18, 70 and 72, were indicated to be various types of light, however, other types of indicators commonly known in the art could be used. Likewise, various types of audible alarms could also be used. The system 20 can be adapted to detect and contain contaminants other than hydrocarbons by using a different type of sensing probe capable of detecting the presence of the applicable contaminant.

The foregoing specifications and drawings are only illustrative of the preferred embodiments of the present invention. They should not be interpreted as limiting the scope of the attached claims. Those skilled in the arts will be able to come up with equivalent embodiments of the present invention without departing from the spirit and scope thereof.

| Element number | Description of element |
| --- | --- |
| 20 | Stormwater pretreatment and disposal system |
| 22 | Retention area |
| 24 | Collection vault |
| 26 | Oil/water separator |
| 28 | Dry well |
| 30 | Valve |
| 32 | Actuator |
| 34 | Controls |
| 36 | Sensing probe |
| 38 | Bottom (of the retention area) |
| 39 | Wall(s) (of the retention area) |
| 40 | inlet (collection vault) |
| 42 | Curb (retention area) |
| 44 | Pipe |
| 46 | Swing check valve |
| 48 | Baffles |
| 50 | Plate coalescer |
| 52 | Manways |
| 54 | Pump out riser |
| 56 | Level sensor riser |
| 58 | Absorbent pillows |
| 60 | vent (oil/water separator) |
| 62 | Second pipe |
| 64 | anti-siphon valve |
| 66 | Protective cage |
| 68 | First Indicator (valve open) |
| 70 | Second Indicator (valve closed) |
| 72 | Third Indicator (alarm) |
| 74 | Audible alarm |
| 76 | Probe float switch |
| 78 | |
| 80 | |
| 82 | |
| 84 | |
| 86 | |
| 88 | |

The invention claimed is:

1. A storm water pretreatment system comprising:
    a retention area including a floor for receiving storm water;
    a collection vault with an inlet in fluid communication with the retention area and an outlet;
    an oil/water separator;
    a dry well;
    a first pipe putting the collection vault in fluid communication with the oil/water separator;
    a second pipe putting the oil/water separator in fluid communication with the dry well; and
    a valve on the second pipe;
    an anti-siphon valve on the second pipe; and
    a sensing probe, controls and actuator operatively attached to the valve and adapted to close said valve upon detection of storm water contaminants.

2. A storm water pretreatment system as claimed in claim 1, further comprising a probe float switch operatively connected to the controls.

3. A storm water pretreatment system as claimed in claim 1, further comprising a first indicator to indicate when the valve is open.

4. A storm water pretreatment system as claimed in claim 1, further comprising an indicator to indicate when the valve is closed.

5. A storm water pretreatment system as claimed in claim 1, further comprising an indicator to indicate when contaminants have been detected in storm water.

6. A storm water pretreatment system as claimed in claim 1, further comprising an audible alarm to indicate when contaminants have been detected in storm water.

7. A storm water pretreatment system as claimed in claim 1, wherein the valve on the second pipe is a butterfly valve.

8. A storm water pretreatment system as claimed in claim 1, wherein the actuator is electrically powered.

9. A storm water pretreatment system as claimed in claim 1, wherein the actuator is hydraulically powered.

10. A storm water pretreatment system as claimed in claim 1, wherein the actuator is pneumatically powered.

11. A storm water pretreatment system as claimed in claim 1, further comprising a swing check valve located on the first pipe.

\* \* \* \* \*